J. D. BURNS.
FRYING PAN.
APPLICATION FILED JAN. 24, 1916.
1,209,551. Patented Dec. 19, 1916.
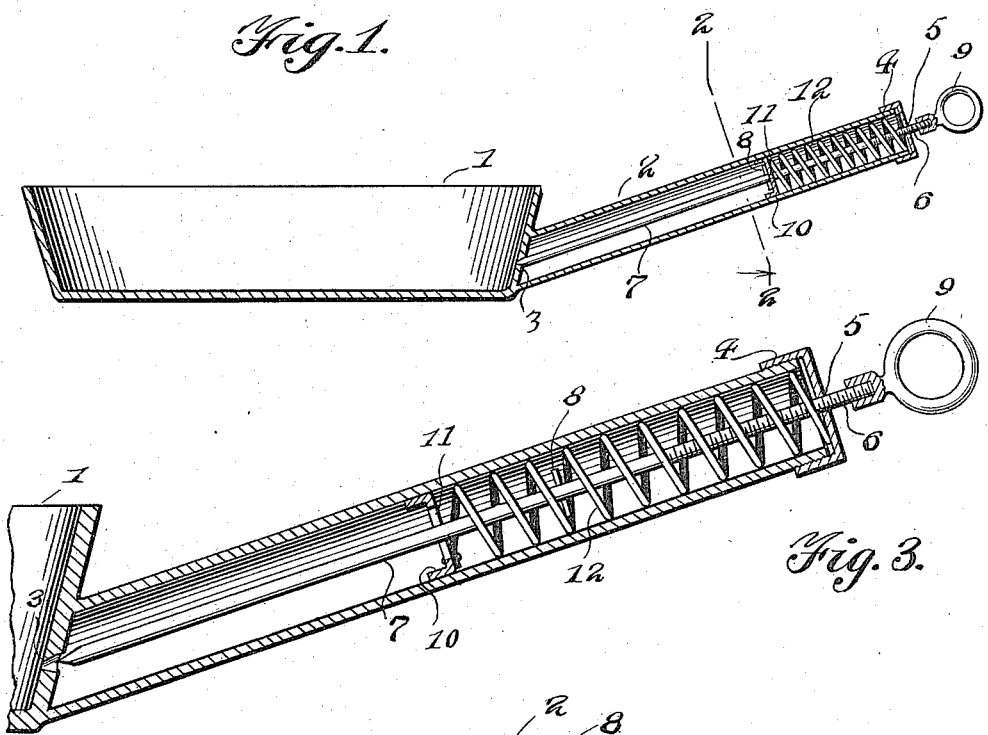
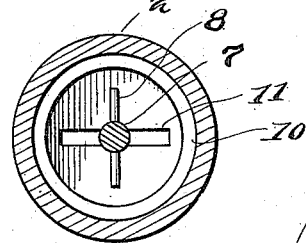
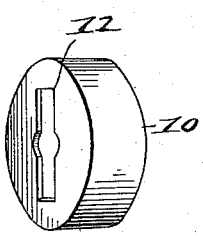
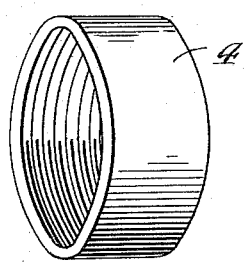
Inventor
John D. Burns.
Witnesses
By Victor J. Evans
Attorney

UNITED STATES PATENT OFFICE.

JOHN D. BURNS, OF VICTOR, COLORADO.

FRYING-PAN.

1,209,551.  Specification of Letters Patent.  Patented Dec. 19, 1916.

Application filed January 24, 1916. Serial No. 73,939.

*To all whom it may concern:*

Be it known that I, JOHN D. BURNS, a citizen of the United States, residing at Victor, in the county of Teller and State of Colorado, have invented new and useful Improvements in Frying-Pans, of which the following is a specification.

This invention relates to frying pans, skillets and the like.

An object of the invention is to provide a frying pan or skillet with a hollow handle, a port being arranged between the pan and handle which is normally closed by a suitable valve that is operated from the outer end of the handle, the said handle providing a receptacle for the grease with which articles are to be cooked in the pan, whereby a predetermined amount of the said grease may be fed to the pan at desired intervals only.

Another object of the invention is to provide a frying pan with a hollow handle having a port communicating with the said hollow handle, to arrange in the handle a valve stem which engages with the port to close the same, to provide upon the stem a spring pressed plunger which is adapted to contact with grease to force the same in the direction of the port as well as through the said port when the valve is operated to uncover the said port.

With the above and other objects in view, the improvement resides in the construction, combination and arrangement of parts set forth in the following specification and falling within the scope of the appended claims.

In the drawing: Figure 1 is a longitudinal sectional view through a frying pan and the handle thereof constructed in accordance with the present invention, Fig. 2 is an enlarged transverse sectional view approximately on the line 2—2 of Fig. 1 illustrating the arrangement of parts before the plunger is released from the valve stem, Fig. 3 is a detail longitudinal sectional view through the handle showing the arrangement of parts after the plunger has been released from the valve stem, Fig. 4 is a detail perspective view of the plunger, and Fig. 5 is a similar view of the cap.

In the drawing the numeral 1 designates an ordinary frying pan or skillet which is provided with an angularly arranged hollow handle 2 which has a port 3 communicating with the said handle. The handle, at the outer end thereof is preferably threaded to receive the threaded flange of a cap 4, and this cap is provided with a threaded orifice 5 through which is passed the threaded end 6 of a valve stem 7, the end of said valve being normally received in and closing the port 3. If desired suitable guide means may be provided for the valve 7, and the said valve, at a suitable point thereon has laterally extending studs 8.

The numeral 9 designates the ring or handle member which is removably connected to the outer end of the valve stem 7. 10 designates a plunger which is preferably provided with a peripheral flange and is of a size to be snugly received in the hollow handle. The plunger is provided with an elongated slot 11 so that the same can be passed over the stem 7 and when the studs 8 are arranged to contact with the plunger at a right angle with respect to the elongated slot 11, the plunger, through the medium of a helical spring 12 which exerts a tension between the plunger and the cap, will be held upon the stem in contact with the studs 8. When the stem 7 is rotated to bring the studs 8 in a line with the elongated slot 11 of the plunger 10, the tension of the spring 12 will force the plunger longitudinally of the stem in the direction of the port 3, thus compressing the grease in the handle between the plunger and the port. By this means a further operation of the plunger 7 to uncover the port 3 will permit of a quantity of grease being forced into the pan 1 through the port 3. When a sufficient quantity of grease is permitted to enter the pan, the plunger is again operated to close the port and after all of the grease has been used, the cap 4 may be unscrewed to permit of the withdrawal of the plunger, the stem and the spring. If desired, the spring may have one of its ends secured to the plunger and as the ring member 9 is removably connected with the valve stem 7, the cap, the spring and the plunger may be removed from the hollow handle without permitting the stem 7 uncovering the port 3, so that grease can be inserted in the handle without danger of the same passing through the port 3 to within the pan.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. A frying pan or the like having a port, a hollow handle secured to the pan and surrounding the port, a cap closing the hollow handle, a longitudinally adjustable member connected with the cap for closing the port.

2. A frying pan or the like having a port, a hollow handle surrounding the port, a valve in the handle and operative from the exterior thereof for closing the port, and a spring pressed plunger in the handle.

3. A frying pan or the like having a port on its side, a hollow handle surrounding the port, a rotatable cap for the handle, said cap having a threaded orifice, a valve including a stem having a threaded portion received in the threaded orifice of the cap and said valve normally closing the port, a plunger surrounding the valve stem, and a spring member connected with the cap and with the plunger.

4. A pan or the like having a port in its side, a hollow handle secured to the pan and surrounding the port, a removable and adjustable cap for the handle, said cap having a threaded opening, a valve for the port including a threaded stem engaging in the threaded opening of the cap, a handle for the valve stem, transverse lugs on the valve stem, a plunger having an elongated opening arranged upon the stem and contacted by the lugs when in one position and a helical spring arranged between the cap and plunger and secured to the plunger, as and for the purpose set forth.

In testimony whereof I affix my signature in presence of two witnesses.

JOHN D. BURNS.

Witnesses:
 VALENTINE GETZ,
 JOHN A. REID.

Copies of this patent may be obtained for five cents each, by addressing the "Commissioner of Patents, Washington, D. C."